(12) United States Patent
Liu et al.

(10) Patent No.: US 9,716,776 B2
(45) Date of Patent: Jul. 25, 2017

(54) PHYSICAL KEYBOARD AND NETWORK ACCESS METHOD

(71) Applicant: Huizhou TCL Mobile Communication Co., Ltd, Huizhou (CN)

(72) Inventors: Yuk tung Thomas Liu, Huizhou (CN); Vittorio Di Mauro, Huizhou (CN); Jizhong Li, Huizhou (CN); Chunguang Ma, Huizhou (CN); Wei Ma, Huizhou (CN)

(73) Assignee: Huizhou TCL Mobile Communication Co., Ltd., Huizhou (CN)

( * ) Notice: Subject to any disclaimer, the term of this patent is extended or adjusted under 35 U.S.C. 154(b) by 0 days.

(21) Appl. No.: 15/028,404

(22) PCT Filed: May 27, 2015

(86) PCT No.: PCT/CN2015/079908
§ 371 (c)(1),
(2) Date: May 19, 2016

(87) PCT Pub. No.: WO2016/155106
PCT Pub. Date: Oct. 6, 2016

(65) Prior Publication Data
US 2016/0294993 A1 Oct. 6, 2016

(30) Foreign Application Priority Data

Mar. 30, 2015 (CN) .......................... 2015 1 0150196

(51) Int. Cl.
*H04W 48/08* (2009.01)
*H04M 1/02* (2006.01)
(Continued)

(52) U.S. Cl.
CPC ........ *H04M 1/0202* (2013.01); *G06F 3/0219* (2013.01); *G06F 3/0231* (2013.01);
(Continued)

(58) Field of Classification Search
CPC .... H04M 1/0202; H04W 76/02; H04W 48/08
See application file for complete search history.

(56) References Cited

U.S. PATENT DOCUMENTS

| | | | | |
|---|---|---|---|---|
| 2004/0239533 A1* | 12/2004 | Bollman | ............... | G06F 1/1626 341/22 |
| 2012/0274566 A1* | 11/2012 | Tran | ..................... | G06F 1/1654 345/168 |
| 2014/0067189 A1* | 3/2014 | Smith | ..................... | G08G 1/166 701/29.1 |

FOREIGN PATENT DOCUMENTS

CN 201837967 A 5/2011
CN 202372922 U 8/2012
(Continued)

OTHER PUBLICATIONS

International Search Report on corresponding PCT application (PCT/CN2015/079908) from International Searching Authority (CN) dated Jan. 6, 2016.

*Primary Examiner* — Tuan H Nguyen
(74) *Attorney, Agent, or Firm* — Klein, O'Neill & Singh, LLP

(57) ABSTRACT

A physical keyboard and a network access method are provided. The physical keyboard is provided with a card slot, and after a wireless network card is inserted into the card slot, the physical keyboard is connected to a wireless network by the wireless network card so that the mobile terminal can achieve network access through the wireless network connected to the physical keyboard while the key-in data input of the mobile terminal is accomplished. The physical keyboard of the present disclosure not only has the key-in data input function but also can achieve the network access by means of the wireless network card. Moreover, the network connected to the wireless network card may be converted into the WLANs such as a Wi-Fi network by the
(Continued)

physical keyboard 10 to provide access points for other terminals, and this improves the using experience and meanwhile saves the consumption cost of the user.

20 Claims, 3 Drawing Sheets

(51) Int. Cl.
*G06F 3/02* (2006.01)
*G06F 3/023* (2006.01)
*H04W 76/02* (2009.01)
*H04W 84/12* (2009.01)

(52) U.S. Cl.
CPC ........... *H04W 48/08* (2013.01); *H04W 76/02* (2013.01); *H04W 84/12* (2013.01)

(56) References Cited

FOREIGN PATENT DOCUMENTS

| | | |
|---|---|---|
| CN | 103019394 U | 4/2013 |
| CN | 203102167 A | 7/2013 |
| CN | 203191938 U | 9/2013 |
| CN | 203386117 U | 1/2014 |
| CN | 203535586 U | 4/2014 |
| CN | 103885602 U | 6/2014 |
| CN | 104020855 A | 9/2014 |

\* cited by examiner

PHYSICAL KEYBOARD AND NETWORK ACCESS METHOD

FIELD OF THE INVENTION

The present disclosure relates to the technical field of communication terminals, specifically to the technical field of network access, and more particularly, to a physical keyboard and a network access method utilizing the same.

BACKGROUND OF THE INVENTION

Currently, physical keyboards available on the market generally adopt the Bluetooth technology with low power consumption to be connected to tablet computers so that users can conveniently input characters into the tablet computers or utilize shortcut keys on the physical keyboards to control the tablet computers so as to accomplish key-in data input. On the other hand, a fixed Wi-Fi router or a carry-on wireless network card is usually required to connect the tablet computer to a wireless network. Thus, the key-in data input and the network access are implemented respectively by the physical keyboard and the tablet computer, and this inevitably influences the using experience of the users.

SUMMARY OF THE INVENTION

Accordingly, embodiments of the present disclosure provide a physical keyboard and a network access method which enables the physical keyboard to have both key-in data input and network access functions.

One technical solution adopted in the present disclosure is as follows: a physical keyboard is provided. The physical keyboard may be optionally connected with a mobile terminal to input key-in data. The physical keyboard can define a card slot for inserting the wireless network card. The physical keyboard can be connected to a wireless network by the wireless network card, so that the mobile terminal can access the wireless network by connecting to the physical keyboard.

Preferably, the wireless network card is connected to the wireless network via a first antenna, and the first antenna is disposed within the physical keyboard or integrated into the wireless network card.

In one embodiment, the physical keyboard further comprises spring-loaded pins, wherein the mobile terminal is provided with feed points that correspond to the spring-loaded pins, and the spring-loaded pins engage the feed points correspondingly for data exchange between the mobile terminal and the physical keyboard so that the mobile terminal achieves the key-in data input and the network access.

In one embodiment, the mobile terminal and the physical keyboard exchange data via a short distance wireless communication technology so as to achieve the key-in data input and the network access.

Preferably, a wireless local area network (WLAN) conversion module and a second antenna are disposed within the physical keyboard, the WLAN conversion module is configured to convert the wireless network into the WLAN, and the mobile terminal is connected to the WLAN via the second antenna.

Preferably, the wireless network includes a 4G network, and the WLAN includes a Wi-Fi network.

Another technical solution adopted in the present disclosure is to provide a network access method. The network access method comprises the following steps of: inserting a wireless network card into a card slot of a physical keyboard; connecting the physical keyboard to a wireless network through the wireless network card; connecting the physical keyboard with a mobile terminal; accessing the wireless network, by the mobile terminal, wherein key-in data input of the mobile terminal is accomplished through the physical keyboard.

In one embodiment, the step of achieving the key-in data input and the network access by the mobile terminal comprises the following steps of: disposing a first antenna in the physical keyboard or in the wireless network card so that the wireless network card is connected to the wireless network via the first antenna; disposing spring-loaded pins in the physical keyboard and disposing feed points that correspond to the spring-loaded pins in the mobile terminal; and plugging the spring-loaded pins into the feed points correspondingly for data exchange between the mobile terminal and the physical keyboard so that the mobile terminal achieves the key-in data input and the network access through the physical keyboard.

Preferably, the step of achieving the key-in data input and the network access by the mobile terminal comprises the following steps of: disposing a first antenna in the physical keyboard or in the wireless network card so that the wireless network card is connected to the wireless network via the first antenna; and adopting a short distance wireless communication technology for data exchange between the mobile terminal and the physical keyboard so as to achieve the key-in data input and the network access.

Preferably, the step of adopting a short distance wireless communication technology for data exchange between the mobile terminal and the physical keyboard so as to achieve the network access comprises the following steps of: disposing a WLAN conversion module and a second antenna within the physical keyboard; and converting the wireless network into a WLAN through the WLAN conversion module, and connecting the mobile terminal to the WLAN via the second antenna.

According to the physical keyboard and the network access method of the embodiments of the present disclosure, the physical keyboard not only has the key-in data input function but also can accomplish the network access by means of the wireless network card. Moreover, the network connected to the wireless network card may be converted into the WLANs such as a Wi-Fi network by the physical keyboard to provide access points for other terminals, and this improves the using experience and meanwhile saves the consumption cost of the user.

DETAILED DESCRIPTION OF THE INVENTION

Hereinbelow, the technical solutions of embodiments of the present disclosure will be described clearly and completely with reference to the attached drawings. Obviously, the embodiments described herein are only some of but not all of the embodiments of the present disclosure. All other embodiments that can be devised without making inventive efforts by those of ordinary skill in the art upon reviewing the embodiments of the present disclosure shall fall within the scope of the present disclosure.

Figure 1:
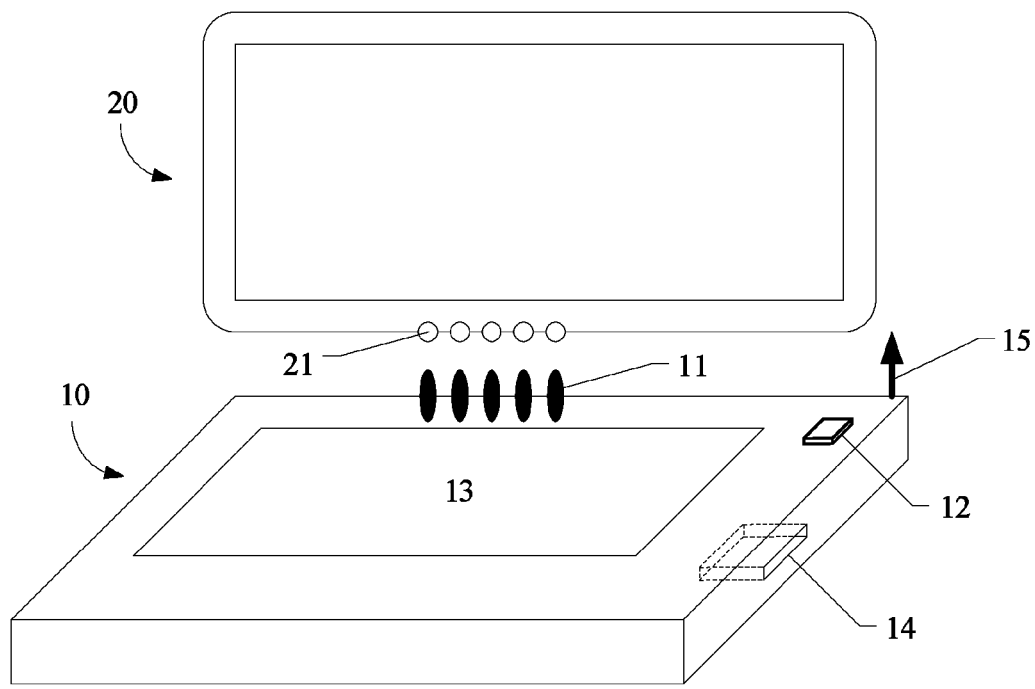
FIG. 1 is a schematic view of a physical keyboard cooperating with a mobile terminal according to an embodiment of the present disclosure.

FIG. 1 is a schematic view of a physical keyboard cooperating with a mobile terminal according to an embodiment of the present disclosure. As shown in FIG. 1, a physical keyboard 10 may be optionally connected with a mobile terminal 20, and after the physical keyboard 10 is connected to the mobile terminal 20, the mobile terminal 20 can accomplish key-in data input through the physical keys on the physical keyboard 10. In one embodiment, the physical keyboard 10 is a wireless keyboard. An electrical connection mechanism can be provided between the physical keyboard 10 and the mobile terminal 20 such that the physical keyboard 10 can be detachably mounted on the mobile terminal 20. The data transmission can be achieved between the physical keyboard 10 and the mobile terminal 20 via the electrical connection mechanism. In one embodiment, the electrical connection mechanism comprises pins 11 formed on the physical keyboard 10 and feed points 21 formed on the mobile terminal 20. The pins 11 can be conductive. The pins 11 can also be spring-loaded. A length or height of the pins 11 may be adjustable. In one embodiment, the pins 11 comprises a base and a tip slidably captured in the base and partially extending out an opening of the base. A spring can be received in the base to bias the tip away from a bottom of the base to adjust a height of the pin 11. The tip and the base can maintain direct electrical contact between the tip and the base, indirect electrical contact via the spring, or a combination of both. The tip can have a rounded, flat, or pointed end. In some embodiments, the pins 11 are POGO® pins. Specifically, the physical keyboard 10 can comprise the pins 11, a control chip 12 and keys on a physical key-in area 13. The mobile terminal 20 can be provided with the feed points 21 that correspond to the pins 11 in both position and quantity. The pins 11 can be plugged into the feed points 21 correspondingly. The control chip 12 can receive key-in instructions from the user by pressing the physical key-in area 13, and can convert the key-in instructions into digital signals. The digital signals can be transmitted to a processor inside the mobile terminal 20 through the pins 11 and the feed points 21, and then the processor can respond accordingly to accomplish the key-in data input.

The mobile terminal 20 can also accomplish network access through the physical keypad 10 of the embodiment of the present disclosure. Specifically, the physical keyboard 10 can be further provided with a card slot 14 and an antenna 15. For example, the card slot 14 can be disposed at a side of the physical key-in area 13 of the physical keyboard 10 for receiving a wireless network card. After the wireless network card is inserted into the card slot 14, a web-surfing function of the physical keyboard 10 can be activated so that the physical keyboard 10 can be connected to a corresponding wireless network via the antenna 15. The wireless network may be, for example, the 4G (The 4th Generation mobile communication technology) wireless network, and the wireless network card can be a 4G network card. It shall be appreciated that the physical keyboard 10 of other embodiments of the present disclosure may be connected to the wireless network via the antenna 15 that is integrated into the wireless network card, so that the physical keyboard 10 does not need to be provided with the antenna 15.

The network access essentially means that the mobile terminal 20 is able to receive data from and transmit data to the wireless network through the physical keyboard 10. The physical keyboard 10 further comprises a modem and a radio frequency (RF) transceiver chip. After the wireless network card is inserted into the card slot 14, the modem activates the web-surfacing function of the physical keyboard 10, and then the RF transceiver chip is activated.

The data are received in the following way: receiving, by the antenna 15, RF signals generated by the wireless network card; filtering and modulating the RF signals and then outputting IQ signals by the RF transceiver chip; converting, by the modem, the IQ signals into digital signals through analog-to-digital conversion; and transmitting the digital signals to the processor of the mobile terminal 20 through the pins 11 and the feed points 21 that are connected together.

The data are transmitted in the following way: transmitting the digital signals of the mobile terminal 20 to the physical keyboard 10 through the pins 11 and the feed points 21 that are connected together; converting the digital signals into IQ signals through digital-to-analogue conversion; modulating the IQ signals and then outputting the modulated IQ signals to the RF transceiver chip by the modem; amplifying the power of the modulated IQ signals by the RF transceiver chip; and transmitting the resulting signals through the antenna 15.

Figure 2:
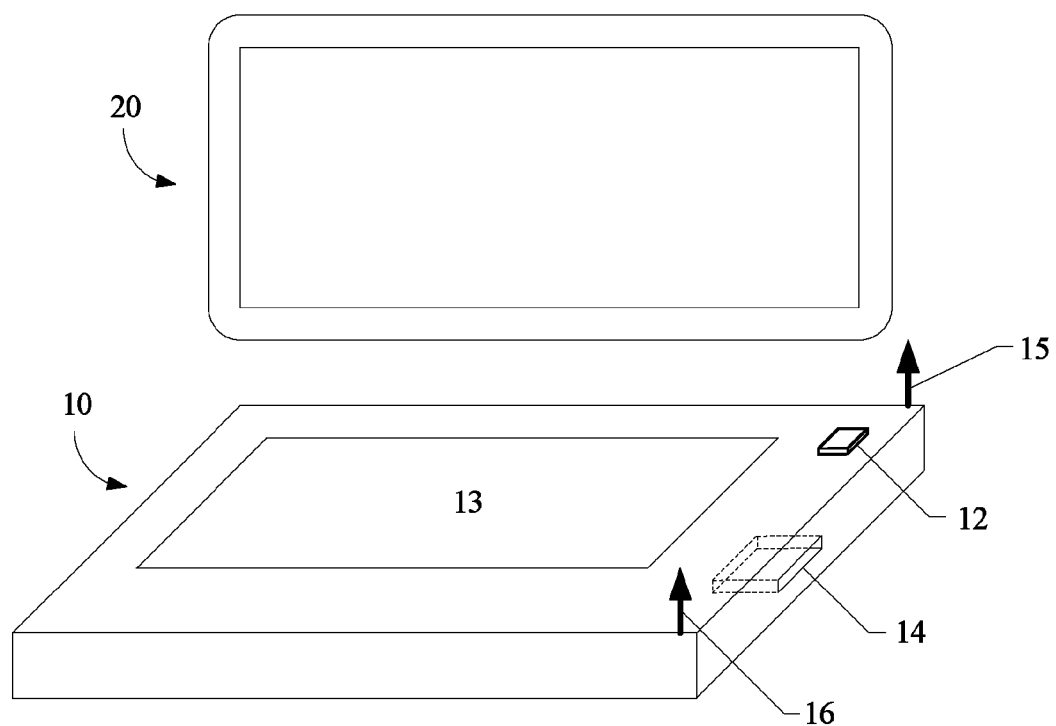
FIG. 2 is a schematic view of a physical keyboard cooperating with a mobile terminal according to another embodiment of the present disclosure.

FIG. 2 is a schematic view of a physical keyboard cooperating with a mobile terminal according to another embodiment of the present disclosure. In the illustrated embodiment, there is no electrical connection mechanism formed between the physical keyboard and the mobile terminal. To simplify the description and compare various embodiments, the same symbols are adopted in this embodiment to indicate identical or similar components described above, and thus only the differences therebetween will be described. As shown in FIG. 2, a short distance wireless communication technology (e.g., Bluetooth or infrared RF connection) can be adopted for data exchange between the mobile terminal 20 and the physical keyboard 10 so as to achieve the key-in data input and the network access.

The key-in data input is accomplished in the following way: receiving, by the control chip 12 of the physical keyboard 10, key-in instructions from the user given by pressing the physical key-in area 13; converting the key-in instructions into digital signals; and transmitting the digital signals to the processor inside the mobile terminal 20 by means of the short distance wireless communication technology, and then the processor responds accordingly to achieve the key-in data input.

The way in which the network access is accomplished may make reference to the aforesaid way in which the mobile terminal 20 receives data from and transmits data to the wireless network through the physical keyboard 10, and the differences therebetween lie in that: data are transmitted between the mobile terminal 20 and the physical keyboard 10 through the short distance wireless communication technology in this embodiment instead of through the pins 11 and the feed points 21 that are connected together in the aforesaid embodiment.

Still referring to FIG. 2, the physical keyboard 10 is further provided with an antenna 16 (the antenna 15 may be view as the first antenna, and the antenna 16 may be view as the second antenna). Different from the aforesaid embodiment, the physical keyboard 10 in this embodiment may provide WLAN (e.g., Wi-Fi network) access points via the antenna 16 so that the mobile terminal 20 accomplishes the network access through the WLAN. Specifically:

A wireless local area network (WLAN) conversion module is disposed within the physical keyboard 10 and is configured to convert the aforesaid wireless network connected to the wireless network card into the WLAN, i.e., convert wireless network signals into WLAN signals. In this case, the antenna 16 is equivalent to a wireless access point (AP). After the mobile terminal 20 is connected to the physical keyboard 10 by means of the short distance wireless communication technology, the mobile terminal 20 can control the AP through an application (APP) installed therein, e.g., open or close the AP, change the name of the AP, change a connection password, or monitor the names and the quantity of the apparatuses to which the mobile terminal 20 is connected.

Further speaking, the physical keyboard 10 of the embodiments of the present disclosure not only has the key-in data input function but also can accomplish the network access by means of the wireless network card. Moreover, the network connected to the wireless network card may be converted into the WLANs such as a Wi-Fi network by the physical keyboard 10 to provide access points for other terminals, and this improves the using experience and meanwhile saves the consumption cost of the user.

Based on the objective and the benefits of the present disclosure, the aforesaid mobile terminal 20 may be a tablet computer or any terminal having the network access function (including a portable communication device, a Personal Digital Assistant (PDA), etc), the aforesaid wireless network may be a 4G network, and the WLAN may be a Wi-Fi network, but it is not limited thereto.

Figure 3:
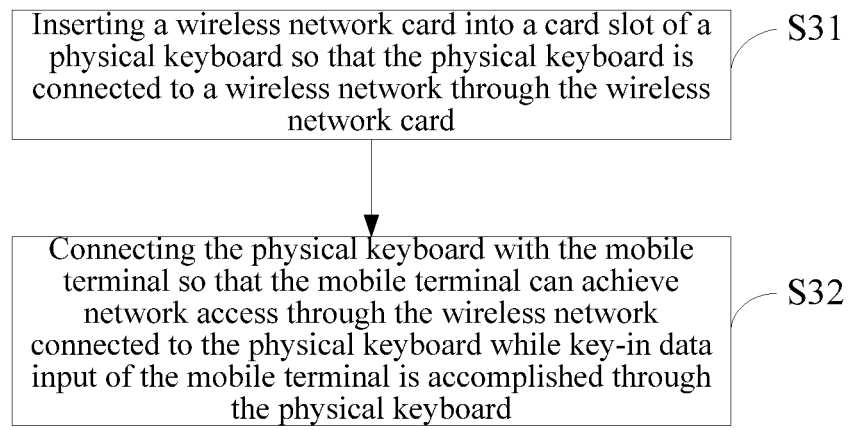
FIG. 3 is a schematic flowchart diagram of a network access method according to an embodiment of the present disclosure.

FIG. 3 is a schematic flowchart diagram of a network access method according to an embodiment of the present disclosure. As shown in FIG. 3, the network access method of this embodiment comprises the following steps:

Step S31: inserting a wireless network card into a card slot of a physical keyboard so that the physical keyboard is connected to a wireless network through the wireless network card.

Step S32: connecting the physical keyboard with the mobile terminal so that the mobile terminal can achieve network access through the wireless network connected to the physical keyboard while key-in data input of the mobile terminal is accomplished through the physical keyboard.

The network access method of this embodiment is accomplished through the aforesaid physical keyboard 10 and mobile terminal 20, and the process and the principle of the key-in data input and the network access may make reference to the aforesaid embodiments and thus will not be further described herein. Thus, the network access method has the aforesaid benefits.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A physical keyboard, for connecting with a mobile terminal to enter key-in data input, wherein the physical keyboard has a web-surfing function and defines a card slot for receiving a wireless network card, and the physical keyboard is connected directly to a wireless network through the wireless network card to activate the web-surfing function of the physical keyboard so that the mobile terminal can access the wireless network through the physical keyboard.

2. The physical keyboard of claim 1, wherein the wireless network card is connected to the wireless network via a first antenna, and the first antenna is disposed within the physical keyboard or integrated into the wireless network card.

3. The physical keyboard of claim 2, further comprising spring-loaded pins, wherein the mobile terminal is provided with feed points that correspond to the spring-loaded pins, and the spring-loaded pins engage the feed points correspondingly for data exchange between the mobile terminal and the physical keyboard so that the mobile terminal achieves the key-in data input and the network access through the physical keyboard.

4. The physical keyboard of claim 2, wherein the mobile terminal and the physical keyboard exchange data via a short distance wireless communication technology.

5. The physical keyboard of claim 4, wherein a wireless local area network (WLAN) conversion module and a second antenna are disposed within the physical keyboard, the WLAN conversion module is configured to convert the wireless network into the WLAN, and the mobile terminal is connected to the WLAN via the second antenna.

6. The physical keyboard of claim 5, wherein the wireless network comprises a 4G network, and the WLAN comprises a Wi-Fi network.

7. A network access method, comprising the following steps of: inserting a wireless network card into a card slot of a physical keyboard to activate a web-surfing function of the physical keyboard so that the physical keyboard can be connected directly to a wireless network: connecting the physical keyboard to the wireless network through the wireless network card to perform the web-surfing function: connecting the physical keyboard with a mobile terminal; accessing the wireless network, by the mobile terminal, wherein key-in data input of the mobile terminal is accomplished through the physical keyboard.

8. The network access method of claim 7, wherein the step of achieving the key-in data input and the network access by the mobile terminal comprises the following steps of:
disposing a first antenna in the physical keyboard or in the wireless network card so that the wireless network card is connected to the wireless network via the first antenna;
disposing spring-loaded pins in the physical keyboard and disposing feed points that correspond to the spring-loaded pins in the mobile terminal; and
plugging the spring-loaded pins into the feed points correspondingly for data exchange between the mobile terminal and the physical keyboard so that the mobile terminal achieves the key-in data input and the network access through the physical keyboard.

9. The network access method of claim 7, wherein the step of achieving the key-in data input and the network access by the mobile terminal comprises the following steps of:
disposing a first antenna in the physical keyboard or in the wireless network card so that the wireless network card is connected to the wireless network via the first antenna; and
adopting a short distance wireless communication technology for data exchange between the mobile terminal and the physical keyboard so as to achieve the key-in data input and the network access.

10. The network access method of claim 9, wherein the step of adopting a short distance wireless communication technology for data exchange between the mobile terminal and the physical keyboard so as to achieve the network access comprises the following steps of:

disposing a WLAN conversion module and a second antenna within the physical keyboard;

converting the wireless network into a WLAN through the WLAN conversion module; and connecting the mobile terminal to the WLAN via the second antenna.

11. An apparatus comprising: a mobile terminal; and a wireless keyboard connected to the mobile terminal, the wireless keyboard comprising a key-in processing module, a control chip, and a wireless network card, the control chip converting key-in instructions from the key-in processing module into digital signals, which are transmitted to the mobile terminal to realize data transmission between the wireless keyboard and the mobile terminal, the wireless keyboard being connected directly to a wireless network via the wireless network card to perform a web-surfing function, the mobile terminal being connected to the wireless network via the wireless keyboard.

12. The apparatus of claim 11 further comprising an electrical connection mechanism provided between the mobile terminal and the wireless keyboard, wherein the wireless keyboard is detachably connected to the mobile terminal via the electrical connection mechanism.

13. The apparatus of claim 12, wherein the electrical connection mechanism comprises spring-loaded pins formed on the wireless keyboard and feed points formed on the mobile terminal, and the spring-loaded pins are engaged in the feed points.

14. The apparatus of claim 11, wherein the mobile terminal is a tablet computer.

15. The apparatus of claim 11, wherein the wireless keyboard further comprises an antenna, the wireless keyboard defines a card slot for receiving the wireless network card, and the wireless keyboard is connected to the wireless network via the antenna.

16. The apparatus of claim 15, wherein the antenna is integrated into the wireless network card.

17. The apparatus of claim 15, wherein a short distance wireless communication technology is adopted for data exchange between the mobile terminal and the wireless keyboard.

18. The apparatus of claim 17, wherein a wireless local area network conversion module is disposed in the wireless keyboard and is configured to convert the wireless network connected to the wireless network card into WLAN.

19. The apparatus of claim 18, wherein the wireless keyboard comprises another antenna, the wireless keyboard provides WLAN access points via the other antenna.

20. The apparatus of claim 15, wherein the wireless network is a 4G wireless network, and the wireless network card is a 4G network card.

\* \* \* \* \*